United States Patent [19]

Scully

[11] Patent Number: 4,511,220
[45] Date of Patent: Apr. 16, 1985

[54] LASER TARGET SPECKLE ELIMINATOR

[75] Inventor: Charles N. Scully, San Juan Capistrano, Calif.

[73] Assignee: The United States of America as represented by the Secretary of the Air Force, Washington, D.C.

[21] Appl. No.: 452,601

[22] Filed: Dec. 23, 1982

[51] Int. Cl.$^3$ ............................................. G02B 27/48
[52] U.S. Cl. .................................... 350/403; 372/27; 372/99
[58] Field of Search .............................. 350/400–401, 350/403–405, 173; 372/27, 99, 105, 700

[56] References Cited

U.S. PATENT DOCUMENTS

| | | | |
|---|---|---|---|
| 2,182,142 | 12/1939 | Ball et al. | 350/401 |
| 3,447,856 | 6/1969 | De Lange | 350/403 |
| 3,508,809 | 4/1970 | Wilder et al. | 350/157 |
| 3,512,868 | 5/1970 | Gorkiewicz et al. | 350/157 |
| 3,591,254 | 7/1971 | Browne et al. | 350/149 |
| 3,684,350 | 8/1972 | Wentz | 350/150 |
| 3,720,453 | 3/1973 | Lee et al. | 350/3.5 |
| 3,722,982 | 3/1973 | Brandt | 350/405 |
| 3,753,608 | 8/1973 | Bernel | 350/150 |
| 4,019,151 | 4/1977 | Brueckner et al. | 350/401 |
| 4,124,278 | 11/1978 | Grinberg et al. | 350/403 |

OTHER PUBLICATIONS

Porcello et al., "Speckle Reduction in Synthetic-Aperture Radars", Jr. Opt. Soc. America, vol. 66, 1976, pp. 1305–1311.

*Primary Examiner*—William H. Punter
*Attorney, Agent, or Firm*—Donald J. Singer; Jacob N. Erlich

[57] ABSTRACT

An apparatus for eliminating the phenomenon of speckle with regard to laser light reflected from a distant target whose roughness exceeds the wavelength of the laser light. The apparatus includes a half plate wave member, a first polarizing beam splitter member, a totally reflecting right angle prism, and a second polarizing beam splitter member, all of which are in serial optical alignment, that are used in combination to convert a linearly (i.e., vertically) polarized light beam, which is emitted by a laser having a known coherence length, into two coincident, orthogonally polarized, beams that are not coherent with each other, and that have an optical path difference which exceeds the known coherence length of the emitting laser, to eliminate the speckle.

4 Claims, 2 Drawing Figures

LASER TARGET SPECKLE ELIMINATOR

STATEMENT OF GOVERNMENT INTEREST

The invention described herein may be manufactured and used by or for the Government for governmental purposes without the payment of any royalty thereon.

BACKGROUND OF THE INVENTION

This invention relates to laser radiation reflected from a microscopically rough target surface and, more particularly, to the elimination of the undesirable phenomenon related thereto which is known as speckle. The term speckle as used herein means, as it does in the art, the phenomenon in which the scattering of light from a highly coherent source (such as a laser) by a rough surface (or an inhomogeneous medium) generates a random-intensity distribution of light that gives the surface (or the medium) a granular appearance, with resultant significant loss of definition of the surface (or of the medium).

More specifically, laser light, reflected from a distant target whose surface roughness exceeds the wavelength of the laser light, produces nulls and lobes (i.e., speckle) in the detector plane which render target definition difficult or impossible. In fact, in a narrow field of view (e.g., telescope in the detector plan) nulls can be wide enough so that a target goes undetected. As will be shown and discussed later herein, studies show a high probability of such an occurrence.

Accordingly, it is fair and accurate to state that what is needed in the art, and is not presently available, is a simple and reliable means of eliminating the aforementioned speckle.

SUMMARY OF THE INVENTION

The instant invention eliminates the aforesaid laser target speckle, and thereby constitutes a significant advance in the state-of-the-art.

In accordance with the instant invention, a half wave plate member, a first polarizing beam splitter member, a totally reflecting right angle prism, and a second beam splitter member, all of which are in serial optical alignment, are used in combination to convert a linearly (i.e., vertically) polarized light beam, which is emitted by a laser having a known coherence length, into two coincident orthogonally polarized beams that are not coherent with each other, and that have an optical path difference which exceeds the known coherence length of the emitting laser, to eliminate the speckle.

Accordingly, it is an object of the instant invention to provide a laser target speckle eliminator.

It is another object of this invention to provide such a laser target speckle eliminator that is simple in structure.

It is still another object of this invention to provide such a simply-structured laser target speckle eliminator that is highly reliable.

It is yet another object of the instant invention to provide such a highly reliable, simply-structured, laser target speckle eliminator which is inexpensive and easy to construct, manufacture, or the like.

It is a further object of this invention to provide such a laser target speckle eliminator that is readily and effortlessly useable.

These objects of the instant invention, as well as other objects related thereto, will become readily apparent after a consideration of the description of the instant invention, topgether with reference to the Figures of the drawing.

DESCRIPTION OF THE PREFERRED EMBODIMENT

Figure 1:
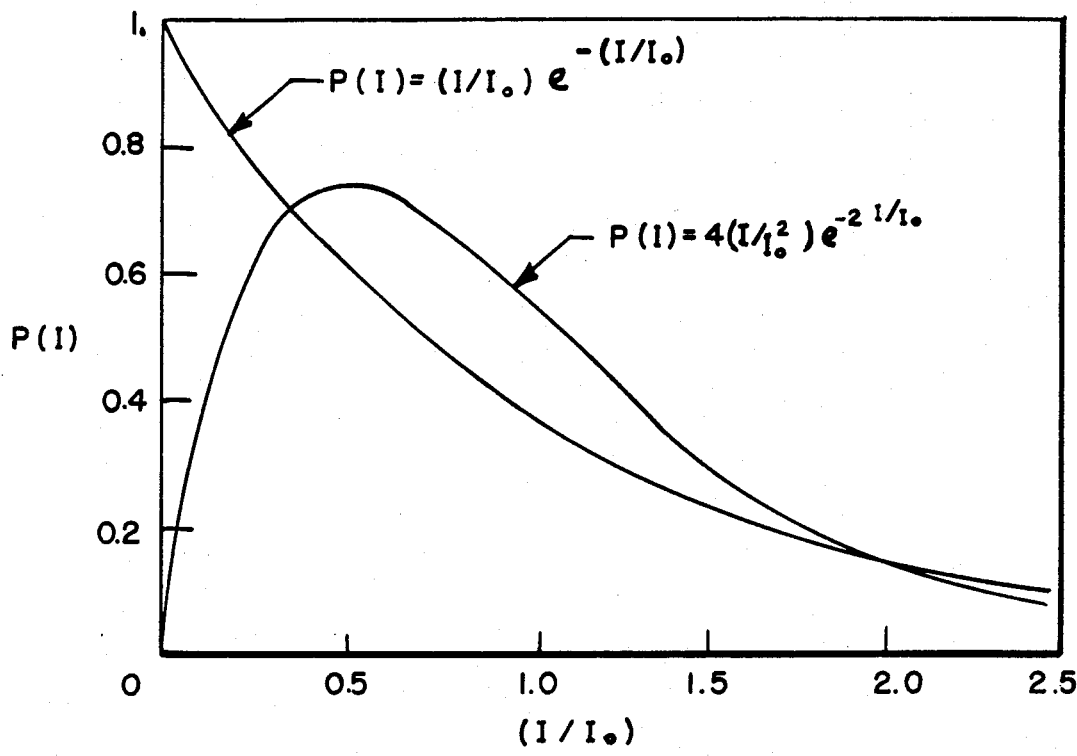
FIG. 1 is a graph of the plot of two probability curves, one as to illumination by linearly polarized laser radiation, and the other as to illumination by unpolarized laser radiation.

As a preliminary matter, reference is made to FIG. 1 which is a graph of the plot of two probability curves showing speckle intensity distribution.

In that regard, it is to be noted that in rough surface illumination by linearly polarized laser radiation, where the sense of polarization is preserved on reflection, distribution of intensity in the (speckle) lobes of the reflected radiation is given by:

$$P(I)=(I/I_o) \exp(-I/I_o) \text{ or } P(I)=(I/I_o)e^{-(I/I_o)} \quad (1)$$

where:

$P(I)$ = Probability that a speckle intensity exceeds a preselected value;

$I$ = The preselected value, and;

$I_o$ = The mean of the speckle instensities averaged over the whole reflected field.

Inspection of the probability function set out hereinabove, and of the corresponding curve in FIG. 1, shows that the most probable speckle intensity is zero. This means that there are more dark areas (or null intensity areas) than bright (speckle) lobes.

For the case where illumination is by unpolarized laser radiation, the corresponding intensity distribution is given by:

$$P(I)=4(I/I_o^2) \exp(-2I/I_o) \text{ or } P(I)=4(I/I_o^2)e^{-2I/I_o} \quad (2)$$

where $P(I)$, $I$, and $I_o$ are as set forth hereinabove.

Examination by this function, and its corresponding curve in FIG. 1, shows that the true nulls do not appear, and that the intensity distribution is quite different. The most probable (speckle) lobe intensity is one-half of the average intensity. The reason for the difference in speckle behavior is that the reflected unpolarized radiation may be considered as composed of two radiation fields, superimposed but orthogonally polarized. The two fields add incoherently (i.e., do not interfere with each other), and the nulls of one field are mostly filled with the (speckle) lobes of the other field.

I have concluded that if the speckle intensity distribution depicted in FIG. 1 is changed from that shown by the curve of equation (1), above, to that of the curve of equation (2), above, then the range of (speckle) lobe intensities also is changed, and nulls (i.e., regions of zero intensity) do not occur.

I have found that my hereinbefore stated conclusion can be easily implemented by converting a polarized laser beam into two coincident, orthogonally polarized, beams (i.e., components). In accordance with the Fresnel-Argo laws, the two beams cannot interfere with each other, nor can the speckle fields produced by their reflection from rough target areas interfere. As a related matter, I have also found that if an optical path difference of the beams is selected such that it exceeds the known coherence length of the laser emitting the light beam, then the desired and needed two coincident beams that are orthogonally polarized, and that are not coherent with each other, are attained.

Figure 2:
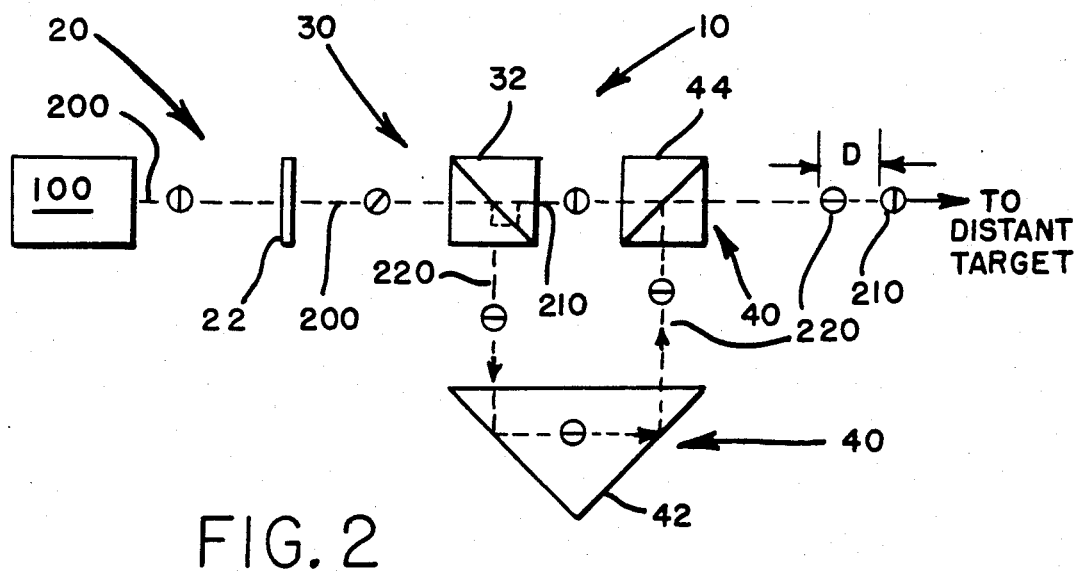
FIG. 2 is a side elevation view, in simplified schematic and pictorial form, of the preferred embodiment of the instant invention.

Now, with reference to FIG. 2, therein is shown in simplified form the preferred embodiment 10 of the instant invention (i.e., a laser target speckle eliminator). In its most basic and generic structural form, the preferred embodiment 10 comprises: means (generally designated 20) for rotating the linearly (i.e., vertically) polarized laser light beam 200 emitted by the laser 100 (which has a known coherence length) 45 degrees, with this means being in optical alignment with the emitted laser light beam 200; means (generally designated 30) for splitting the rotated laser light beam 200 into two orthogonally polarized components (i.e., portions) 210 and 220, where one component 210 is vertically polarized and the other component 220 is horizontally polarized, and where this means 30 is in optical alignment with means 20 for rotating the vertically polarized light beam 200 forty-five (45) degrees; and means (generally designated as 40) for recombining the two components 210 and 220 of the split and rotated laser light beam 200 such that the two components 210 and 220 are coincident and have a light path difference (such as "D") which exceeds the coherence length of the emitting laser 100, where this means 40 is in optical alignment with the means 30 for splitting the rotated laser light beam 200.

More specifically, the means 20, for rotating the vertically polarized light beam 200 forty-five (45) degrees includes a half wave plate member 22 disposed in optical alignment with the linearly polarized laser light beam 200 emitted by the laser 100 such that the emitted laser light beam 200 impinges upon and is rotated and transmitted by the half wave plate member 22.

The means 30 for splitting the rotated polarized laser light beam 200 into the two orthogonally polarized components 210 and 220 of equal intensity includes a first polarizing beam splitter member 32 disposed in optical alignment with the half wave plate member 22 such that the laser light beam 200 which has been rotated and transmitted by the half wave plate member 22 impinges upon and enters the first polarizing beam splitter member 32, is split into the two components 210 and 220, with the vertically polarized component 210 being transmitted, and with the horizontally polarized component 220 being deflected ninety (90) degrees, reflected, and transmitted.

The means 40 for recombining the two components 210 and 220 of the rotated and split polarized laser light beam 200 includes a totally reflecting right angle prism member 42. disposed in optical alignment with the first polarizing beam splitter member 32 such that the horizontally polarized component 220 which has been deflected, reflected, and transmitted by the first polarizing beam splitter member 32 impinges upon and enters the totally reflective right angle prism member 42, is redirected, and is transmitted by the prism member 42.

This means 40 further includes a second polarizing beam splitter member 44 disposed in optical alignment with the totally reflecting right angle prism member 14 such that the horizontally polarized component 220 which has been redirected and transmitted by the prism member 42 impinges upon and enters the second polarizing beam splitter member 44, is reflected, and is transmitted by the second polarizing beam splitter member 44.

MANNER OF OPERATION AND OF USE OF THE PREFERRED EMBODIMENT

The manner of operation, and of use, of the preferred embodiment 10 of the instant invention (i.e., a laser target speckle eliminator) can be easily ascertained by any person of ordinary skill in the art from the foregoing description, coupled with reference to the contents of the Figures of the drawing.

For others, the following simplified and brief explanation is given. As has been detailed herein, when a polarized laser light beam strikes a distant target which has a rough surface, the definition of the reflection of the target is significantly adversely affected by the phenomenon of speckle (which already has been described) to the extent that it is probable that the target will be missed (i.e., go undetected). The use of the instant invention eliminates the speckle phenomenon by rotating the polarized light beam emitted by the target-seeking laser, then splitting it into two components which have special characteristics, and then causing the two components to coincide, while orthogonally polarized and "out-of-step", before striking the target. As a result, the definition of the reflection of the target will be sufficiently good that the target will be detected, rather than be missed.

CONCLUSION

It is abundantly clear from all of the foregoing, and from the contents of the Figures of the drawing, that the stated objects of the instant invention (i.e., a laser target speckle eliminator, as well as other objects related thereto, have been achieved.

It is to be noted that, although there have been described and shown the fundamental and unique features of the instant invention, as applied to a preferred embodiment 10, FIG. 2, nevertheless various other embodiments, variations, adaptations, substitutions, additions, and the like may occur too and can be made by those of ordinary skill in the art.

What is claimed is:

1. A laser target speckle eliminator for use with a linearly polarized laser light beam emitted by a laser having a known coherence length, wherein said laser light beam is polarized vertically, said speckle eliminator comprising:

a. means for rotating said vertically polarized laser light beam 45 degrees, with this means disposed in optical alignment with said emitted laser light beam;

b. means for splitting said rotated laser light beam into two orthogonally polarized components of equal intensity, wherein one component is vertically polarized and the other component is horizontally polarized, and wherein this means is in optical alignment with said means for rotating said vertically polarized laser light beam 45 degrees; and c. means for recombining said two components of said split and rotated laser light beam such that said components are coincident and have a light path difference which exceeds the coherence length of said laser, wherein this means is in optical alignment with said means for splitting said rotated laser light beam;

whereby two coincident beams result that are orthogonally polarized, that are not coherent with each other, and that have an optical path difference which exceeds said known coherence length of said laser; and thereby said two beams cannot cause speckle.

2. A laser target speckle eliminator, as set forth in claim 1, wherein said means for rotating said vertically polarized light beam 45 degrees includes a half wave plate member disposed in optical alignment with said linearly polarized laser light beam emitted by said laser such that said emitted laser light beam impinges upon and is rotated and transmitted by said half wave plate member.

3. A laser target speckle eliminator, as set forth in claim 2, wherein said means for splitting said rotated polarized laser light beam into two orthogonally polarized components of equal intensity includes a first polarizing beam splitter member disposed in optical alignment with said half wave plate member such that said laser light beam which has been rotated and transmitted by said half wave plate member impinges upon and enters said first polarizing beam splitter member, is split into said two components, with said vertically polarized component being transmitted, and with saaid horizontally polarized component being deflected 90 degrees, reflected, and transmitted.

4. A laser target speckle eliminator, as set forth in claim 3, wherein said means for recombining said two components of said rotated and split polarized laser light beam includes:

a. a totally reflecting right angle prism member disposed in optical alignment with said first polarizing beam splitter member such that said horizontally polarized component which has been deflected, reflected, and transmitted by said first polarizing beam splitter member impinges upon and enters said totally reflecting right angle prism member, is redirected, and is transmitted by said prism member; and b. a second polarizing beam splitter member disposed in optical alignment with said totally reflecting right angle prism member such that said horizontally polarized component which has been redirected and transmitted by said prism member impinges upon and enters said second polarizing beam splitter member, is reflected, and is transmitted by said second polarizing beam splitter member;

whereby the optical path of said horizontally polarized component becomes coincident with the optical path of said vertically polarized component.

* * * * *